United States Patent
Kimura

(10) Patent No.: US 9,449,223 B2
(45) Date of Patent: Sep. 20, 2016

(54) IMAGE PROCESSING DEVICE AND IMAGE FORMING APPARATUS

(71) Applicant: KYOCERA Document Solutions Inc., Osaka-shi (JP)

(72) Inventor: Shinichi Kimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 2 days.

(21) Appl. No.: 14/715,082

(22) Filed: May 18, 2015

(65) Prior Publication Data
US 2015/0347834 A1    Dec. 3, 2015

(30) Foreign Application Priority Data
May 27, 2014    (JP) .................................. 2014-109397

(51) Int. Cl.
*G06K 9/00* (2006.01)
*G06K 9/03* (2006.01)

(52) U.S. Cl.
CPC ........... *G06K 9/00442* (2013.01); *G06K 9/036* (2013.01)

(58) Field of Classification Search
None
See application file for complete search history.

(56) References Cited

U.S. PATENT DOCUMENTS

2007/0133020 A1* 6/2007 Uejo .................... G06K 9/2054 358/1.9
2008/0239330 A1* 10/2008 Sato ..................... H04N 1/0036 358/1.1
2010/0245870 A1* 9/2010 Shibata .................. G06K 9/033 358/1.9
2012/0105918 A1* 5/2012 Fan ....................... G06K 9/3208 358/462

FOREIGN PATENT DOCUMENTS

| JP | H09-114918 A | 5/1997 |
| JP | 2000-207376 A | 7/2000 |
| JP | 2012-073749 A | 4/2012 |

OTHER PUBLICATIONS

Translation of the Office Action; "Notice of Reasons for Rejection," issued by the Japanese Patent Office on May 12, 2016, which corresponds to Japanese Patent Application No. 2014-109397 and is related to U.S. Appl. No. 14/715,082.*
An Office Action; "Notice of Reasons for Rejection," issued by the Japanese Patent Office on May 12, 2016, which corresponds to Japanese Patent Application No. 2014-109397 and is related to U.S. Appl. No. 14/715,082.

* cited by examiner

*Primary Examiner* — Aaron W Carter
*Assistant Examiner* — Narek Zohrabyan
(74) *Attorney, Agent, or Firm* — Studebaker & Brackett PC

(57) ABSTRACT

According to a processing period for OCR processing of image data for character recognition for a given page, the image processing section determines whether or not to generate image data for character recognition for a next page subsequent to the given page in accordance with an image quality setting different from that set for the given page. Upon determining generation in accordance with an image quality setting different from that set for the given page, the image processing section determines the image quality setting for the next page based on document type and size of the given page of the original document. The image processing section generates image data for character recognition for the next page in accordance with the determined image quality setting.

9 Claims, 2 Drawing Sheets

IMAGE PROCESSING DEVICE AND IMAGE FORMING APPARATUS

INCORPORATION BY REFERENCE

The present application claims priority under 35 U.S.C. §119 to Japanese Patent Application No. 2014-109397, filed May 27, 2014. The contents of this application are incorporated herein by reference in their entirety.

BACKGROUND

The present disclosure relates to image processing devices and image forming apparatuses.

An image processing device detects a character in an original document image through optical character recognition (OCR) processing.

Such an original document image may include characters in various sizes and/or various languages. Therefore, the OCR processing is preferably performed on an original document image having excellent image quality in order to increase a character recognition accuracy rate.

SUMMARY

An image processing device according to the present disclosure includes an image processing section and a character recognition processing section. The image processing section generates image data for character recognition, page by page from image data of an original document. The character recognition processing section executes character recognition processing on the image data for character recognition generated by the image processing section. The image processing section generates image data for character recognition for a given page of the original document in accordance with a preset image quality setting. The image processing section determines whether or not to generate image data for character recognition for a next page subsequent to the given page in accordance with an image quality setting different from the image quality setting set for the given page according to a processing period for character recognition processing of the image data for character recognition for the given page. Upon determining to generate image data for character recognition for the next page in accordance with an image quality setting different from the image quality setting set for the given page, the image processing section determines the image quality setting for the next page based on at least one of document type and size of the given page and generates image data for character recognition for the next page in accordance with the determined image quality setting.

An image forming apparatus according to the present disclosure forms an image on a recording medium and includes an image forming unit configured to form an image on a recording medium and the above image processing device.

DETAILED DESCRIPTION

Embodiments of the present disclosure will be described below with reference to the accompanying drawings.

Figure 1:
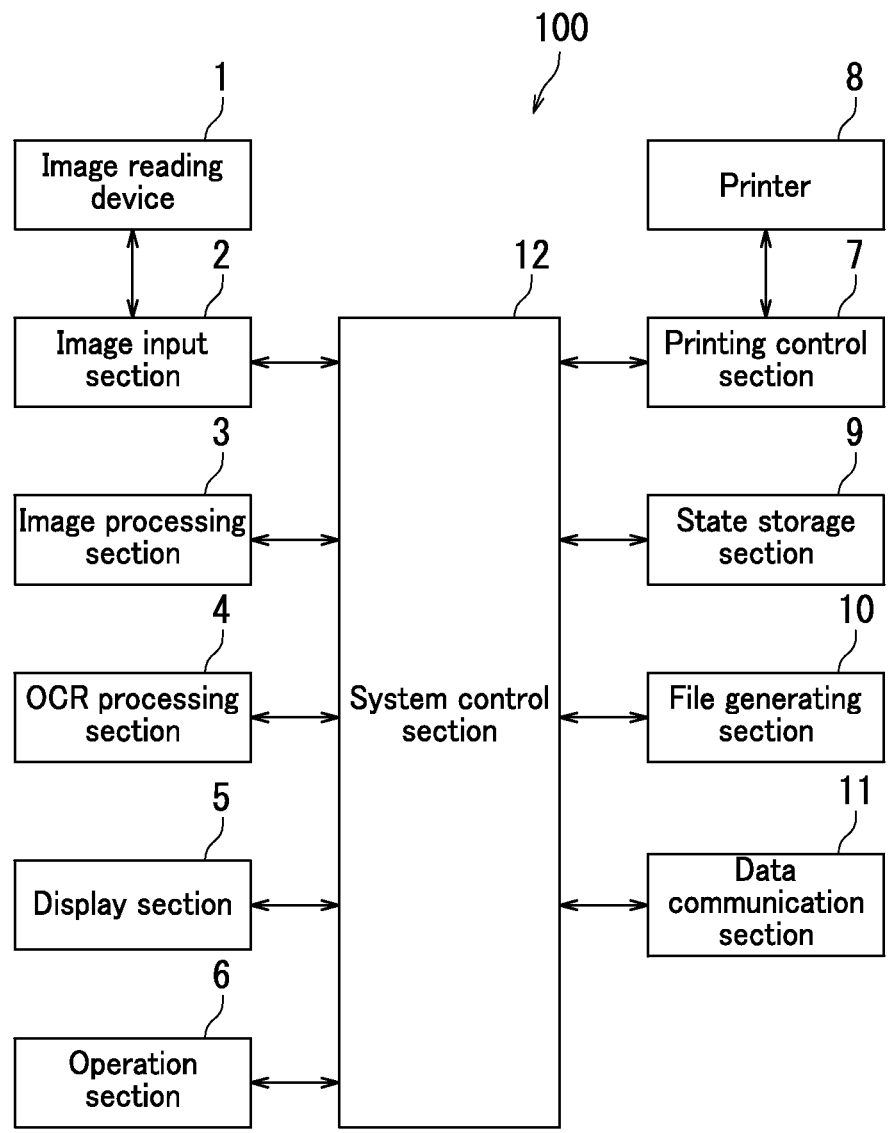
FIG. 1 is a block diagram illustrating a configuration of an image forming apparatus according to an embodiment of the present disclosure.

FIG. 1 is a block diagram illustrating a configuration of an image forming apparatus 100 according to an embodiment of the present disclosure.

The image forming apparatus 100 illustrated in FIG. 1 is a multifunction peripheral that includes an image reading device 1, an image input section 2, an image processing section 3, an OCR processing section 4, a display section 5, an operation section 6, a printing control section 7, a printer 8, a state storage section 9, a file generating section 10, a data communication section 11, and a system control section 12.

The image reading device 1 optically reads an original document image from an original document to generate image data of the original document image.

The image input section 2 obtains the image data of the original document image generated by the image reading device 1 or image data of an original document image received through the data communication section 11.

The image processing section 3 generates image data for character recognition page by page from the image data of the original document image obtained by the image input section 2. The image processing section 3 generates image data for character recognition for each page of the original document in accordance with an image quality setting set for image data of the page.

The image processing section 3 generates image data for character recognition for a given page of the original document in accordance with a preset image quality setting. Further, the image processing section 3 determines whether or not to generate image data for character recognition for a next page subsequent to the given page of the original document in accordance with an image quality setting different from that set for the given page. The image processing section 3 performs the aforementioned determination according to a processing period for character recognition processing (herein after referred to as OCR processing) of the image data for character recognition for the given page by the OCR processing section 4. Upon determining to generate image data for character recognition for the next page in accordance with an image quality setting different from that set for the image data of the given page, the image processing section 3 then determines an image quality setting for the next page based on at least one of document type and size of the given page. The image processing section 3 then generates image data for character recognition for the next page in accordance with the determined image quality setting. Note that the image quality setting set for the next page is an image quality setting that can reduce a processing period for OCR processing from that of OCR processing of the image data for the given page. The image processing section 3 is equivalent to one section of an image processing device according to the present disclosure.

A processing period for OCR processing generally depends on the data size of image data for character recognition. The processing period also depends on the number of objects (characters, line drawings, ruled lines, etc.) included in an original document image. In short, the processing period for the OCR processing depends on the content of an original document image.

The image quality setting in the present embodiment includes a color setting, a tone level number setting, a resolution setting, and a filter setting.

The color setting is to specify monochrome or full color for image data for character recognition.

The tone level number setting is to specify the number of tone levels for image data for character recognition.

As to the color setting and the tone level number setting, there may be generated, for example, full-color image data for character recognition in 256 tone levels, monochrome image data for character recognition in 256 tone levels, or binarized monochrome image data for character recognition.

The filter setting includes a setting to turn on or off processing to convert any density value in image data for character recognition that is not greater than a first density value to a predetermined minimum density value (0% herein). The filter setting further includes a setting to turn on or off processing to convert any density value in the image data for character recognition that is not less than a second density value to a predetermined maximum density value (100% herein). Note that the first and second density values are predetermined density values. The second density value is higher than the first density value.

For example, upon the above two settings of the filter setting being set to turn on the processing in a situation in which image data for character recognition is 8-bit RGB data (color data), the following processing is performed. For any pixel having color components which all have density values not greater than the first density value, each of the density values is set to be the predetermined minimum density value (e.g., (R, G, B)=(0, 0, 0)). Similarly, for any pixels each having color components all of which have density values not less than the second density value, each of the density values is set to be the predetermined maximum density value (e.g., (R, G, B)=(255, 255, 255)).

Note that upon the two settings of the filter setting being set to turn on the processing, the contrast of the original document image is increased without the data size being reduced. This can facilitate character recognition in the OCR processing, thereby enabling reduction in a processing period for OCR processing.

The OCR processing section 4 performs OCR processing on the image data for character recognition generated by the image processing section 3 to detect a character in the original document image. The OCR processing section 4 serves as a character recognition processing section equivalent to one section of the image processing device.

The display section 5 includes, for example, a liquid crystal display and an indicator, and displays information such as a state of the image forming apparatus 100 and change in image quality setting for OCR processing. The operation section 6 includes, for example, a touch panel and hard keys to receive user's operation and output it as electric signals to the system control section 12.

The printing control section 7 controls the printer 8 to execute printing of an image such as an original document image. The printer 8 prints an original document image on recording paper using, for example, an electrographic method. The printing control section 7 and the printer 8 are example of sections included in an image forming unit.

The state storage section 9 for example stores a state of the image forming apparatus 100 and various settings.

The file generating section 10 generates a file including raster image data of an original document image and text obtained through character recognition by the OCR processing section 4. For example, the file generating section 10 generates a portable document format (PDF) file including a layer of raster image data of an original document image and a layer of text obtained through character recognition by the OCR processing section 4.

The data communication section 11 may be, for example, a network interface for data communication with a terminal device, such as a personal computer. The data communication section 11 receives image data of an original document image from the terminal device. Further, the data communication section 11 transmits a file generated by the file generating section 10 to a terminal device in accordance with a predetermined protocol.

The system control section 12 controls the image reading device 1, the image input section 2, the image processing section 3, the OCR processing section 4, the display section 5, the operation section 6, the printing control section 7, the printer 8, the state storage section 9, the file generating section 10, and the data communication section 11 for execution of various jobs.

Note that the image input section 2, the image processing section 3, the OCR processing section 4, the printing control section 7, the file generating section 10, and the aforementioned system control section 12 are implemented by a computer that executes control programs, application specific integrated circuit (ASIC), or the like.

Figure 2:
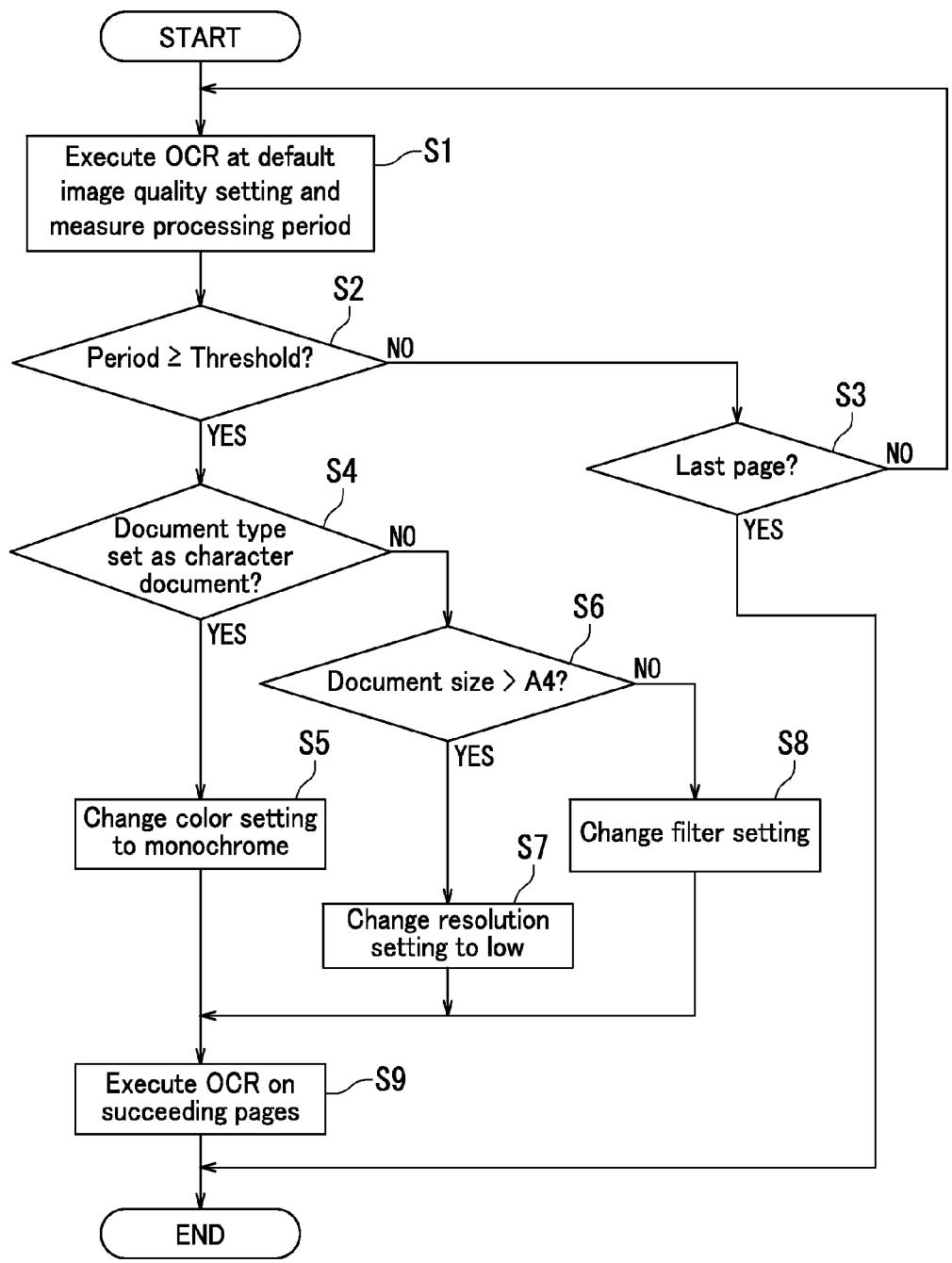
FIG. 2 is a flowchart depicting an operation of the image forming apparatus illustrated in FIG. 1.

An operation of the image forming apparatus 100 will be described next. FIG. 2 is a flowchart depicting the operation of the image forming apparatus 100 illustrated in FIG. 1.

The system control section 12 receives an instruction to execute a user-specified job (e.g., scan job) from the operation section 6 or from an external terminal device via the data communication section 11. The system control section 12 then causes corresponding sections to execute the following processing as a part of the received job.

The image forming apparatus 100 according to the present embodiment executes the OCR processing in any of three modes, that is, a manual mode with OCR accuracy prioritized, a manual mode with OCR speed prioritized, and a self-determined mode. The OCR processing in the manual mode with OCR accuracy prioritized is likely to be executed on image data for character recognition having comparatively large data size and, as a result, the processing period for the OCR processing is comparatively long. The OCR processing in the manual mode with OCR speed prioritized is likely to be executed on image data for character recognition having comparatively small data size, so that the processing period for the OCR processing is comparatively short. The OCR processing in the self-determined mode is executed in the following manner.

First, from image data of the first page of the original document, the image processing section 3 generates image data for character recognition for the first page in accordance with a default image setting. The OCR processing section 4 then executes OCR processing on the generated image data for character recognition (Step S1).

Note that the default image quality setting is the same as the image quality setting in the manual mode with OCR accuracy prioritized as described above. Specifically, the default image quality setting is a setting for generating full-color image data in 256 tone levels at a resolution of 600 dpi with the two settings of the filter setting both set to turn off the processing.

The image processing section 3 measures a processing period for the OCR processing for the first page by the OCR processing section 4 (Step S1). The image processing section 3 then determines whether or not the measured processing period is equal to or greater than a predetermined first threshold period (Step S2).

Upon determining that the processing period is less than the first threshold period (NO at Step S2), the image processing section 3 determines whether or not the page having been subjected to the OCR processing is the last page; that is, whether or not a next page is present (Step S3).

Upon determining that the page that has been subjected to the OCR processing at Step S1 is not the last page (NO at Step S3), the image processing section 3 generates next image data for character recognition for the next page of the original document in accordance with the default image quality setting. In addition, the OCR processing section 4 executes OCR processing on the newly generated image data for character recognition (Step S1). The image processing section 3 then measures a processing period for the OCR processing for the next page by the OCR processing section 4 (Step S1) and determines whether or not the processing period measured at this time is not less than the first threshold period (Step S2).

In this manner, when the processing period for OCR processing of image data of one page is less than the first threshold period (NO at Step S2), image data for character recognition is generated for respective succeeding pages in accordance with the default image quality setting for the OCR processing.

By contrast, when a processing period for the OCR processing of image data of one page is not less than the first threshold period (YES at Step S2), the image processing section 3 sets an image quality setting different from the default image quality setting for the image data for character recognition for a next page subsequent to the one page in order to reduce a processing period for the OCR processing.

Specifically, the image processing section 3 determines whether or not a document type of the original document specified by a user's job execution instruction is set as a character document (Step S4). When the document type is set as the character document (YES at Step S4), the color setting to specify monochrome is set for the next page (Step S5). Note that in a situation in which the color setting to specify monochrome is set for the next page, the tone level number setting for the next page may be left unchanged from that for the given page or may be changed to set the number of tone levels according to the processing period. For example, the tone level number setting may be left unchanged when the processing period is less than a second threshold period that is greater than the first threshold period and may be changed so that the number of tone levels is set at two (i.e., two values for monochrome) when the processing period is not less than the second threshold period.

By contrast, when the document type of the original document is not set as a character document, the image processing section 3 determines whether or not the document size of the given page specified by the user's job execution instruction exceeds a predetermined threshold size (A4 size herein) (Step S6). The document size may be a document size of the given page automatically detected by the image reading device 1.

When the document size exceeds the threshold size (YES at Step S6), the image processing section 3 changes the resolution setting to set a resolution for the next page that is lower than a default resolution (Step S7). The default resolution refers to a resolution set in the default image quality setting. The resolution lower than the default resolution refers to a resolution having half the value of the default resolution (e.g., 300 dpi).

By contrast, when the document size does not exceed the threshold size (NO at Step S6), the image processing section 3 sets the settings of the filter setting to turn on the processing of the image data for character recognition for the next page as below (Step S8). That is, the setting to turn on or off the processing to convert any density value in image data for character recognition that is not greater than the first density to the predetermined minimum density value and the setting to turn on or off the processing to convert any density value therein that is not less than the second density value to the predetermined maximum density value are both set to turn on the processing.

Once the image quality setting for the image data for character recognition for the next page is set as above, the image processing section 3 generates image data for character recognition for the next page in accordance with the determined image quality setting. The OCR processing section 4 then executes OCR processing on the generated image data for character recognition (Step S9). Thereafter, for succeeding pages up to the last page, the image processing section 3 sequentially generates image data for character recognition in accordance with the same image quality setting and the OCR processing section 4 executes OCR processing on the generated image data for character recognition.

As described above, according to the above embodiment, the image processing section 3 generates image data for character recognition, page by page, from image data of an original document. The OCR processing section 4 executes OCR processing on the image data for character recognition generated by the image processing section 3. Specifically, the image processing section 3 generates image data for character recognition for a given page of the original document in accordance with the preset image quality setting. Then, according to a processing period for the OCR processing of the image data for character recognition for the given page, the image processing section 3 determines whether or not to generate image data for character recognition for a next page subsequent to the given page in accordance with an image quality setting different from the image quality setting set for the given page. Further, upon determining to generate image data for character recognition for the next page in accordance with an image quality setting different from that set for the given page, the image processing section 3 then determines an image quality setting for the next page based on at least one of document type and size of the given page of the original document. The image processing section 3 then generates image data for character recognition for the next page in accordance with the determined image quality setting.

Accordingly, in a situation in which a processing period for OCR processing of image data of one page of an original document is long, the image quality setting for image data for character recognition for a next page subsequent to the one page is changed according to the type and size of the original document. In the configuration as above, OCR processing can be executed in a short period of time while also preventing the character recognition accuracy rate from falling.

Note that although the present embodiment is one preferable example of the present disclosure, the present disclosure is not limited thereto and can be modified in various manners within the scope not departing from the subject matter of the present disclosure.

For example, the following configuration may be adopted. That is, at Step S9 in the above embodiment, after changing the image quality setting, the image processing section 3 generates image data for character recognition for a predetermined number of succeeding pages of the original document and the OCR processing section 4 executes OCR processing thereon. Then, the image quality setting is returned to the default image quality setting, and the image processing section 3 continues to generate image data for character recognition and the OCR processing section 4 continues to execute OCR processing thereon again starting from Step S1.

What is claimed is:

1. An image processing device comprising:
an image processing section configured to generate image data for character recognition, page by page from image data of an original document; and
a character recognition processing section configured to execute character recognition processing on the image data for character recognition generated by the image processing section, wherein
the image processing section generates image data for character recognition for a given page of the original document in accordance with a preset image quality setting,
the image processing section determines, according to a processing period for character recognition processing of the image data for character recognition for the given page, whether or not to generate image data for character recognition for a next page subsequent to the given page in accordance with an image quality setting different from the image quality setting set for the given page, and
upon determining to generate image data for character recognition for the next page in accordance with an image quality setting different from the image quality setting set for the given page, the image processing section determines the image quality setting for the next page based on at least one of document type and size of the given page and generates image data for character recognition for the next page in accordance with the determined image quality setting.

2. The image processing device according to claim 1, wherein
the image quality setting includes a filter setting, and
the filter setting includes at least one of a setting to turn on or off processing to convert any density value in image data for character recognition that is not greater than a predetermined density value to a predetermined minimum density value and a setting to turn on or off processing to convert any density value in image data for character recognition that is not less than a predetermined density value to a predetermined maximum density value.

3. The image processing device according to claim 1, wherein
the image quality setting includes a color setting to specify monochrome or full color and a resolution setting,
the image processing section sets the color setting to specify full color and the resolution setting to set a default resolution, and generates the image data for character recognition for the given page of the original document in accordance with the set color setting and the set resolution setting, and
when a processing period for character recognition processing of the image data for character recognition for the given page is not less than a predetermined threshold period,
the image processing section sets the color setting to specify monochrome for the next page in a situation in which the document type of the given page of the original document is set as a character document, and
the image processing section changes the resolution setting to set a predetermined resolution lower than the default resolution for the next page in a situation in which the document type of the given page is not set as the character document and the given page has a document size exceeding a predetermined threshold size.

4. The image processing device according to claim 3, wherein
when the processing period for character recognition processing of the image data for character recognition for the given page is not less than the predetermined threshold period, the image processing section sets at least one of the settings of the filter setting to turn on the processing in a situation in which the document type of the given page is not set as a character document and the given page has a document size not exceeding the threshold size, one of the settings of the filter setting being to turn on or off processing to convert any density value in image data for character recognition that is not greater than a predetermined density value to a predetermined minimum density value, the other of the settings being to turn on or off processing to convert any density value in image data for character recognition that is not less than a predetermined density value to a predetermined maximum density value.

5. The image processing device according to claim 1, wherein
the image quality setting includes a color setting to specify monochrome or full color,
the image processing section sets the color setting to specify full color, and generates image data for character recognition for the given page of the original document in accordance with the set color setting, and
when the processing period for character recognition processing of the image data for character recognition for the given page is not less than a predetermined threshold period, the color setting is changed to specify monochrome for the next page in a situation in which the document type of the given page is set as a character document.

6. The image processing device according to claim 1, wherein
the image quality setting includes a resolution setting,
the image processing section sets the resolution setting to set a default resolution, and generates image data for character recognition for the given page of the original document in accordance with the set resolution setting, and
when the processing period for character recognition processing of the image data for character recognition for the given page is not less than a predetermined threshold period, the resolution setting is changed to set a resolution for the next page to be lower than the default resolution in a situation in which the document type of the given page is set as a character document and the given page has a document size exceeding a predetermined threshold size.

7. The image processing device according to claim 1, wherein
the image quality setting includes a tone level number setting,
the image processing section sets the tone level number setting to set a default tone level number, and generates image data for character recognition for the given page of the original document in accordance with the tone level number setting, and
when the processing period for character recognition processing of the image data for character recognition for the given page is not less than a predetermined threshold period, the tone level number setting is changed to set the number of tone levels for the next page to be less than the default tone level number in a situation in which the document type of the given page is set as the character document and the given page has a document size exceeding a predetermined threshold size.

8. The image processing device according to claim 1, wherein when the processing period for character recognition processing of the image data for character recognition for the given page of the original document is not less than a predetermined threshold period, the image processing section determines the image quality setting so as to reduce the processing period for the character recognition processing.

9. An image forming apparatus for forming an image on a recording medium, comprising:

an image forming unit configured to form an image on a recording medium; and the image processing device according to claim 1.

* * * * *